(12) United States Patent
Ishihara

(10) Patent No.: US 7,014,137 B2
(45) Date of Patent: Mar. 21, 2006

(54) RECORDING TAPE CARTRIDGE

(75) Inventor: Yusuke Ishihara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/443,137

(22) Filed: May 22, 2003

(65) Prior Publication Data
US 2004/0011909 A1 Jan. 22, 2004

(30) Foreign Application Priority Data
May 22, 2002 (JP) .............................. 2002-148063

(51) Int. Cl.
G11B 23/107 (2006.01)
(52) U.S. Cl. .................... 242/348.2; 360/132
(58) Field of Classification Search ............... 242/348, 242/348.2; 360/132
See application file for complete search history.

(56) References Cited

U.S. PATENT DOCUMENTS

| 6,236,539 | B1 | 5/2001 | Morita et al. | |
| 6,648,259 | B1 * | 11/2003 | Shiga et al. | 242/348.2 |
| 6,663,035 | B1 * | 12/2003 | Shiga et al. | 242/348.2 |
| 6,741,423 | B1 * | 5/2004 | Shiga et al. | 360/132 |

* cited by examiner

Primary Examiner—John Q. Nguyen
(74) Attorney, Agent, or Firm—Sughrue Mion, PLLC (57) ABSTRACT

A recording tape cartridge has: a case accommodating a single reel, on which a recording tape is wound, such that the reel is rotatable; an opening which is formed in the case and which is for pulling-out of a leader pin attached to an end portion of the recording tape; a pin holding portion holding the leader pin in a vicinity of the opening; and an anchor spring whose proximal portion is fixed to the case, and, at a free end of the anchor spring, the anchor spring pushes the leader pin and holds the leader pin at the pin holding portion. In the cartridge, a projection, which is a fulcrum of the anchor spring and which is positioned between the proximal portion and the free end of the anchor spring, is provided at the case.

19 Claims, 11 Drawing Sheets

RECORDING TAPE CARTRIDGE

BACKGROUND OF THE INVENTION

1. Technical Field

The present invention relates to a tape cartridge including a case and a single reel which is contained in the case and around which a recording tape such as a magnetic tape used as a record reproducing medium for a computer, is wound.

2. Description of the Related Art

A magnetic tape cartridge is known that includes a single reel which is contained in a case and around which a magnetic tape used as a data record reproducing medium for a computer is wound. A leader member, such as a leader block, leader pin or leader tape, is fixed to a leading end of the magnetic tape. The leader member is drawn from the magnetic tape cartridge by a drawing device provided in a drive system. The magnetic tape fastened to the leader member is wound around a take-up reel of the drive system.

In addition, a reel gear is inscribed in an annular shape at a center of a lower surface of the reel, which is exposed through the hole formed at a lower surface of the magnetic tape cartridge. A driving gear provided on a rotating shaft of the drive system is engaged with the reel gear to rotate the reel. Data is recorded onto the magnetic tape and the recorded data is reproduced by synchronously rotating the reel of the magnetic tape cartridge and the take-up reel of the drive system.

Figure 11:
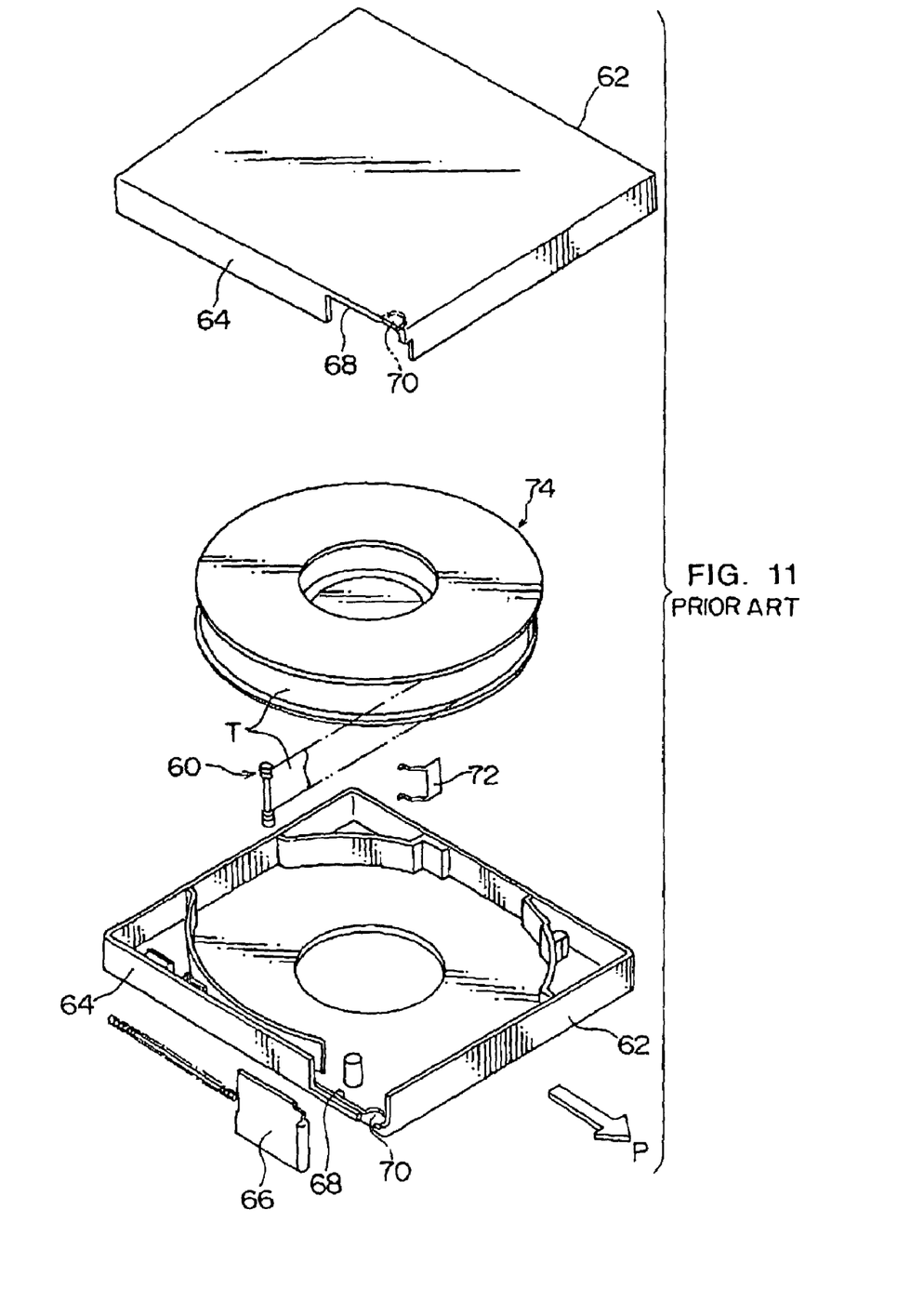
FIG. 11 is a schematic exploded perspective view of a conventional recording tape cartridge.

A large amount of information can be recorded in such a magnetic tape cartridge, and little space is required for accommodating the magnetic tape cartridge at the time of storage. The position of the opening and the type of the door for opening and closing the opening differ for each type of leader member. For example, when a leader pin 60 is provided at an end of a magnetic tape T wound around a reel 74, as shown in FIG. 11, an opening 68 for pulling-out of the leader pin 60 is formed in a side wall 64 of a case 62. The opening 68 is opened and closed by a door 66 which slides in the direction opposite to the direction (the direction of arrow P) of loading the magnetic tape cartridge into a drive device.

Further, a pair of upper and lower pin holding portions 70, which hold the leader pin 60 when the magnetic tape cartridge is not being used, are provided at the inner side of the opening 68 of the case 62. The pin holding portions 70 are concave portions which are substantially semicircular as seen in plan view, and portions thereof are open so that the leader pin 60 can enter therein and exit therefrom. The both end portions of the leader pin 60, which is in a state of standing upright, are inserted into these concave portions (pin holding portions 70). An anchor spring 72 is disposed in a vicinity of the pin holding portions 70. Due to the anchor spring 72 pushing the upper and lower ends of the leader pin 60 toward the inner sides of the respective pin holding portions 70, the leader pin 60 does not fall out from the pin holding portions 70.

When the leader pin 60 enters into and exits from the pin holding portions 70, the anchor spring 72 elastically deforms appropriately, so that movement of the leader pin 60 is permitted. Conventionally, the adjustment of the pushing force (elastic force) of the anchor spring 72 with respect to the leader pin 60 was carried out by adjusting the elastic force of the anchor spring 72 itself. Namely, the elastic force depended on the thickness the length, and the angle of bending of the anchor spring 72.

If the adjustment of the pushing force (elastic force) of the anchor spring with respect to the leader pin can only be carried out by adjusting the elastic force of the anchor spring itself in this way, spring fatigue occurs at the anchor spring due to repeated use. Thus, there are cases in which the force by which the anchor spring pushes the leader pin varies. There is the concern that the problem that the leader pin cannot be held stably will arise.

SUMMARY OF THE INVENTION

An object of the present invention is to provide a recording tape cartridge in which a leader pin can always be held stably regardless of the frequency of use.

In order to achieve the above object, a recording tape cartridge relating to the present invention has a case accommodating a single reel, on which a recording tape is wound, such that the reel is rotatable. A portion, which has an opening for pulling-out of a leader pin attached to an end portion of the recording tape, is formed at the case. The recording tape cartridge has a pin holding portion holding the leader pin in a vicinity of the opening. The recording tape cartridge also has an anchor spring whose proximal portion is fixed to the case, and at the free end thereof, the anchor spring pushes the leader pin and holds the leader pin at the pin holding portion. A projection, which is a fulcrum of the anchor spring and which is positioned between the proximal portion and the free end of the anchor spring, is provided at the case.

In accordance therewith, the elastic force of the anchor spring which pushes the leader pin is adjusted by the projection which is a fulcrum, which is provided at the case between the proximal portion and the free end of the anchor spring. Accordingly, as compared with a case in which the elastic force of the anchor spring is adjusted at the anchor spring itself, the leader pin can always be held in a more stable state.

BRIEF DESCRIPTION OF THE DRAWINGS

FIG. 7A is a schematic perspective view showing an insert die.

DETAILED DESCRIPTION OF THE INVENTION

Hereinafter, a recording tape cartridge 10 relating to an embodiment of the present invention will be described on the basis of the drawings. First, the overall structure of the recording tape cartridge 10 will be briefly described, and then, the main portions relating to the present invention will be described in detail. Note that, for convenience of explanation, the direction of loading the recording tape cartridge 10 into a drive device is denoted by arrow A, and this direction is called the forward direction (front side) of the recording tape cartridge 10. Further, the direction of arrow B, which is orthogonal to arrow A, is the rightward direction.

Figure 1:
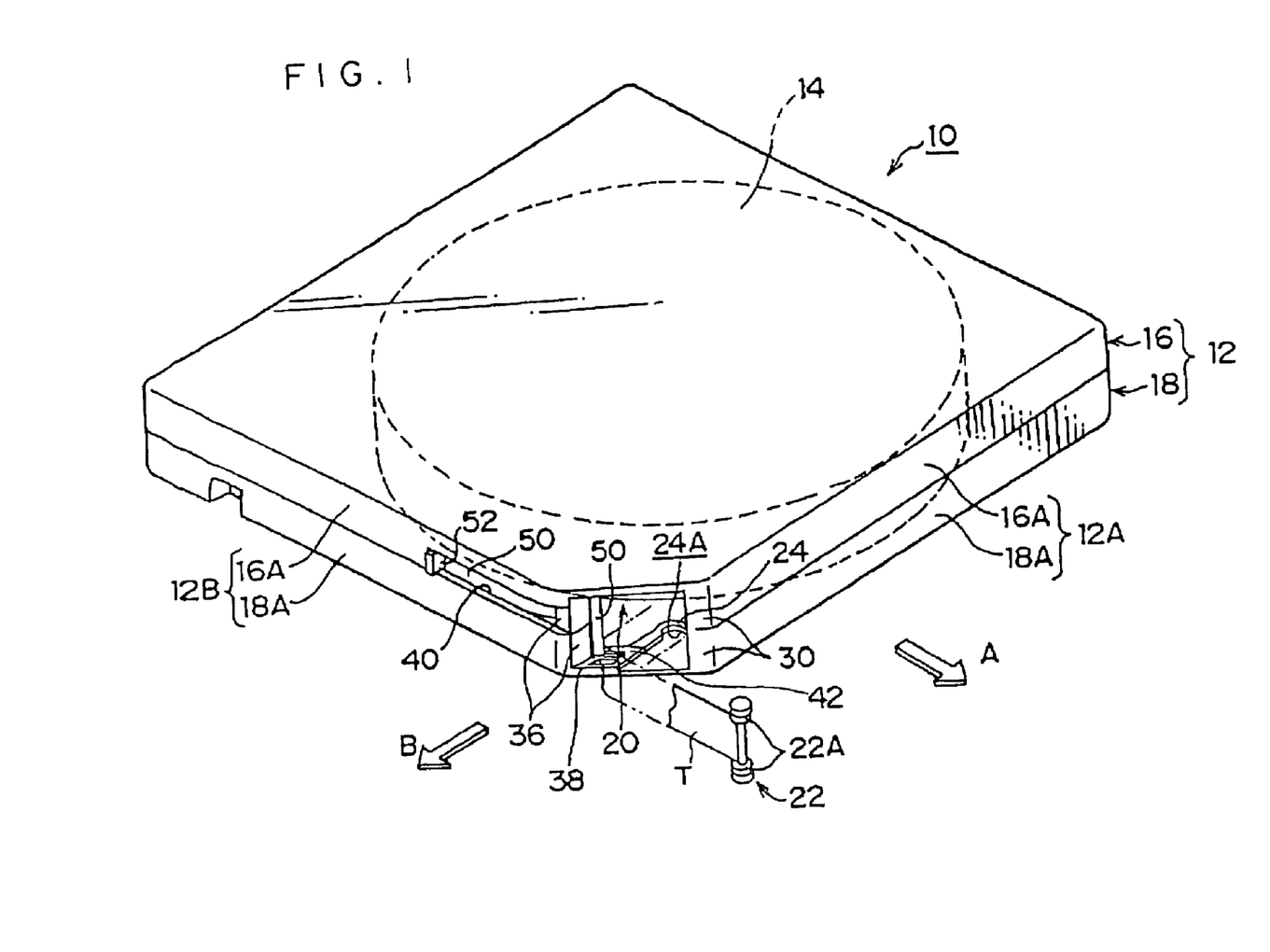
FIG. 1 is a schematic perspective view of a recording tape cartridge.
Figure 2:
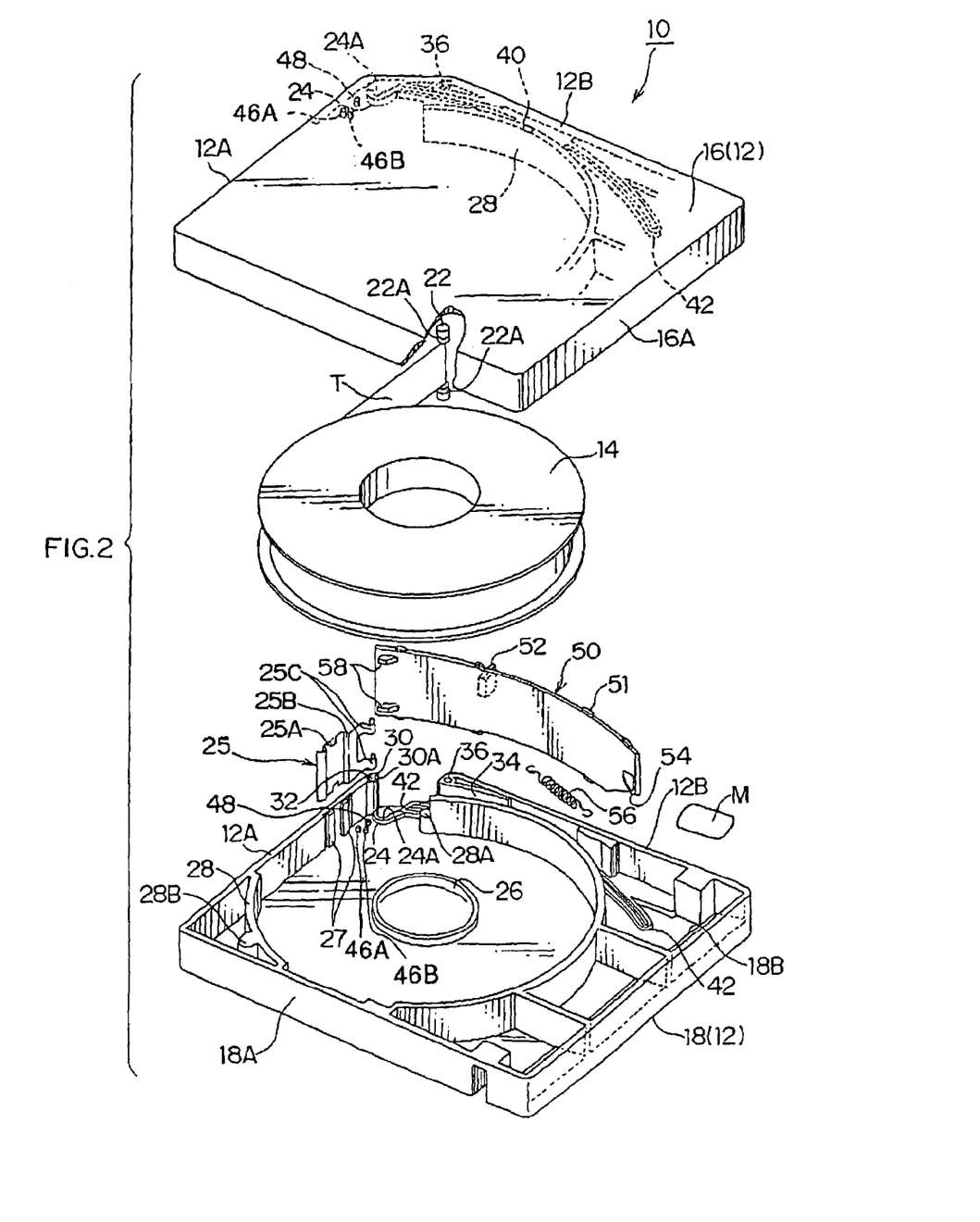
FIG. 2 is a schematic exploded perspective view of the recording tape cartridge.

As shown in FIGS. 1 and 2, the recording tape cartridge 10 is structured such that a single reel 14, on which is wound a magnetic tape T serving as a recording tape which is an information recording/playback medium, is rotatably accommodated within a case 12 which is substantially rectangular as seen in plan view. The case 12 is formed by peripheral walls 16A and 18A of an upper case 16 and a lower case 18 being set to oppose one another and being joined together. At each of the peripheral walls 16A, 18A, the front right corner portion, which is one corner portion at the leading side in the direction of loading the recording tape cartridge 10 into a drive device, is cut obliquely as seen in plan view. A space for accommodating the reel 14, on which the magnetic tape T is wound, is formed at the interior of the case 12.

The cut corner portions of the peripheral walls 16A, 18A form an opening 20 for the pulling-out of the magnetic tape T. A leader pin 22, which is pulled-out by a pull-out means of a drive device, is connected to the free end of the magnetic tape T which is pulled out from the opening 20. An annular groove 22A is formed in each of the end portions of the leader pin 22 which project out further than the transverse direction end portions of the magnetic tape T. Due to the annular grooves 22A being anchored by hooks or the like of the pull-out means, the hooks or the like do not contact and scratch the magnetic tape T at the time of pulling-out the magnetic tape T.

Further, a gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by movement restricting walls 28 which project out at portions of the inner surfaces of the upper case 16 and the lower case 18 and which serve as inner walls which are on a circular locus which is coaxial with the gear opening 26.

An enclosure 28A, in which a hole for position regulation is formed, is provided 60 as to be continuous with the end portion of the movement restricting wall 28 in a vicinity of the opening 20. Further, an enclosure 28B, in which is formed a hole for position regulation which is a long hole, is provided so as to be continuous with the movement restricting wall 28 at the inner side of the front left corner portion of the case 12. The enclosures 28A, 28B are disposed on a single straight line which extends along the direction of arrow B. The end portions of the movement restricting walls 28, except for the end portions thereof at which the enclosures 28A are continuous, are continuous with the peripheral wall 16A or the peripheral wall 18A of the case 12, so as to partition the outer sides of the movement restricting walls 28 and the space at which the reel 14 is set.

A memory board M, which stores various types of information, is set at the rear right portion of the lower case 18 for each recording tape cartridge 10. A rear inner wall 18B is formed at an inclined surface of a predetermined angle and the memory board M is disposed so as to be inclined at a predetermined angle, such that sensing is possible at a drive device which reads from the bottom surface side and at a library device (a device which accommodates a plurality of the recording tape cartridges 10 and which automatically loads and removes the recording tape cartridges 10 from drive devices) which reads from the rear wall side. Further, an unillustrated write protect tab, which is set so that recording onto the recording tape cartridge 10 is possible or is not possible, is provided at the left rear portion of the lower case 18.

Figure 3:
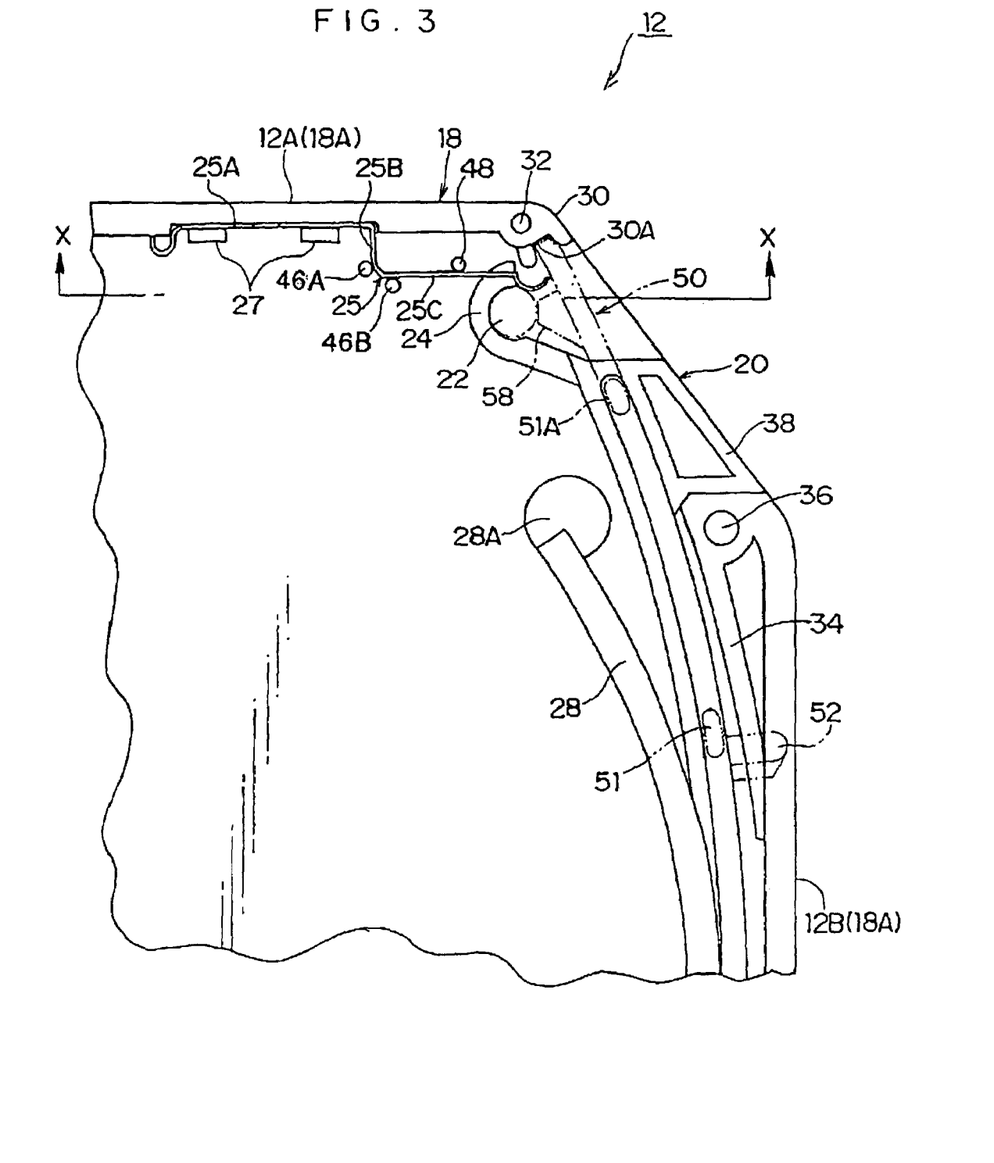
FIG. 3 is a schematic plan view showing main portions of a lower case.

A pair of top and bottom inclined wall portions 30, which are short and which prescribe the front edge portion of the opening 20, are formed at the right end portion of a front wall 12A of the case 12 (see FIG. 3). The inclined wall portions 30 are bent along the plane of opening of the opening 20, and the wall thickness thereof is thicker than that of the front wall 12A. A concave portion 30A, into which the distal end of a door 50 which will be described later enters, is formed at the central portion in the direction of the thickness of the inclined wall portion 30. Further, a pair of upper and lower screw bosses 32 are continuous with the inner side of the front wall 12A in vicinities of the left sides of the inclined wall portions 30.

A pair of upper and lower inclined wall portions 34, which are shaped, in plan view, so as to substantially follow along the outer peripheral surface of the door 50 which will be described later, are provided at inner side of the front end portion of a right wall 12B of the case 12. (The right wall 12B is the portion of the peripheral walls 16A, 18A where the outer surfaces thereof face in the direction of arrow B.) The front end surfaces of the inclined wall portions 34 prescribe the rear edge of the opening 20. A pair of upper and lower screw bosses 36 are provided at the front end portions of the inclined wall portions 34. Further, the inner surfaces of the inclined wall portions 34 function to prevent joggling of the door 50 at the time when the door 50 is slid.

A slit 40 which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting-out the lower portion of the front side of the peripheral wall 16A of the upper case 16 which forms the right wall 12B, and the slit 40 opens toward the opening 20 as well. However, the outer surface of the screw boss 36 at the upper case 16 is exposed from the slit 40 (see FIG. 1).

Guide wall portions 42, which are predetermined heights (e.g., about 1.0 mm to 1.5 mm) and which support convex portions 51 of the door 50 which will be described later such that the convex portions 51 are nipped from both the inner surface side and the outer surface side, stand erect at the upper case 16 and the lower case 18 from a vicinity of the opening 20 to a vicinity of the rear wall. The guide wall portions 42 have different lengths at the upper case 16 and the lower case 18. The guide wall portion 42 at the upper case 16 is formed such that the rear half side thereof is longer than that of the guide wall portion 42 at the lower case 18. This is because the rear inner wall 18B of the lower case 18 is an inclined surface of a predetermined angle, and the memory board M is provided at the right wall 12B side thereof.

Further, the rear end portions of the guide wall portions 42 are closed in substantial arc-shapes as seen in plan view, and restrict the convex portions 51 which are furthest toward the rear at both the top and bottom of the door 50 such that the door 50 cannot move any further rearward. The front end portions of the guide wall portions 42 extend to positions which, when the leader pin 22 is entering and exiting, do not impede the entry or exit of the leader pin 22, e.g., as shown in FIG. 3, positions which are about half of the opening width and which are further rearward than pin holding portions 24 which will be described later. In the same way as described above, the convex portions 51 which are furthest toward the front at both the top and bottom of the door 50 are restricted such that the door 50 is closed and cannot move any further forward. The dimensions of the respective portions are determined such that, in this state, the distal end of the door 50 enters into the concave portions 30A of the inclined wall portions 30.

Further, ribs 38 (see FIG. 3), which are substantially trapezoidal in plan view and which are integral with the guide wall portions 42 at the outer sides which are exposed from the opening 20, stand erect at the inner surface of the upper case 16 and the inner surface of the lower case 18 so as to be the same heights as the guide wall portions 42. The strength of the upper case 16 and the lower case 18 at the opening 20 portion is ensured by these ribs 38.

The upper case 16 and the lower case 18 are fixed and joined together by unillustrated screws being screwed, from beneath, into the screw bosses 32, 36 which are positioned in the vicinities of the edge portions of the opening 20, and into other unillustrated screw bosses provided at predetermined positions respectively. In this way, the corner portions at both ends of the opening 20, which are prescribed by the free ends of the inclined wall portions 30 (the front wall 12A) and the inclined wall portions 34 (the right wall 12B) and which are disadvantageous in terms of strength and which easily hit the ground or the like when the case 12 is dropped, are joined together strongly. Even if the case 12 is dropped, the case 12 does not deform or buckle due to the entire weight of the recording tape cartridge 10.

Next, the pin holding portions 24 and the anchor spring 25 will be described. The pair of upper and lower pin holding portions 24, which position and hold the leader pin 22 at the interior of the case 12, are provided at the inner side of the opening 20 of the case 12. As shown in FIGS. 1 through 3, the pin holding portions 24 are formed in substantially semicylindrical shapes as seen in plan view, such that that magnetic tape T pull-out sides thereof are open. The end portions of the leader pin 22 which is in a state of standing upright can enter into and exit from the pin holding portions 24 from the open sides thereof. Note that the pin holding portions 24 are integrally continuous with the guide wall portions 42 at the inner sides. The heights of the pin holding portions 24 may be substantially the same as the heights of the guide wall portions 42 with which they are integrally continuous, or may be higher than the heights of the guide wall portions 42.

In vicinities of the pin holding portions 24, a proximal portion 25A of the anchor spring 25 is inserted and fixed in spring holding portions 27 which are provided at the inner surface of the front wall 12A. (The front wall 12A is the portion of the peripheral walls 16A, 18A where the outer surfaces face in the direction of arrow A.) The distal ends (free ends) of an operation portion 25C of the anchor spring 25, which have been divided so as to be forked in two, push the upper and lower ends of the leader pin 22 toward the inner sides of the pin holding portions 24, and thereby hold the leader pin 22 within the pin holding portions 24. When the leader pin 22 enters into the exits from the pin holding portions 24, the operation portion 25C of the anchor spring 25 elastically deforms appropriately so as to permit movement of the leader pin 22.

The plate thickness of the areas where the pin holding portions 24 are set is relatively thick (e.g., 2 mm) at both the upper case 16 and the lower case 18. This is in order to increase the strength in the vicinities of the pin holding portions 24 which are the holding (positioning) positions of the leader pin 22 which are most important to the functioning of the recording tape cartridge 10 (in order for the leader pin 22 to be correctly engaged by the pull-out means at the time when the recording tape is pulled out), and is so that positional offset of the leader pin 22 does not arise due to impact when the case 12 (the recording tape cartridge 10) is dropped or the like. Note that, as shown in FIG. 3, when the positions at which the pin holding portions 24 are set are near the screw bosses 32, it is possible to even further prevent positional offset of the leader pin 22 due to vibrations of the ceiling plate and the bottom plate when the case 12 is dropped or the like.

Figure 5A:
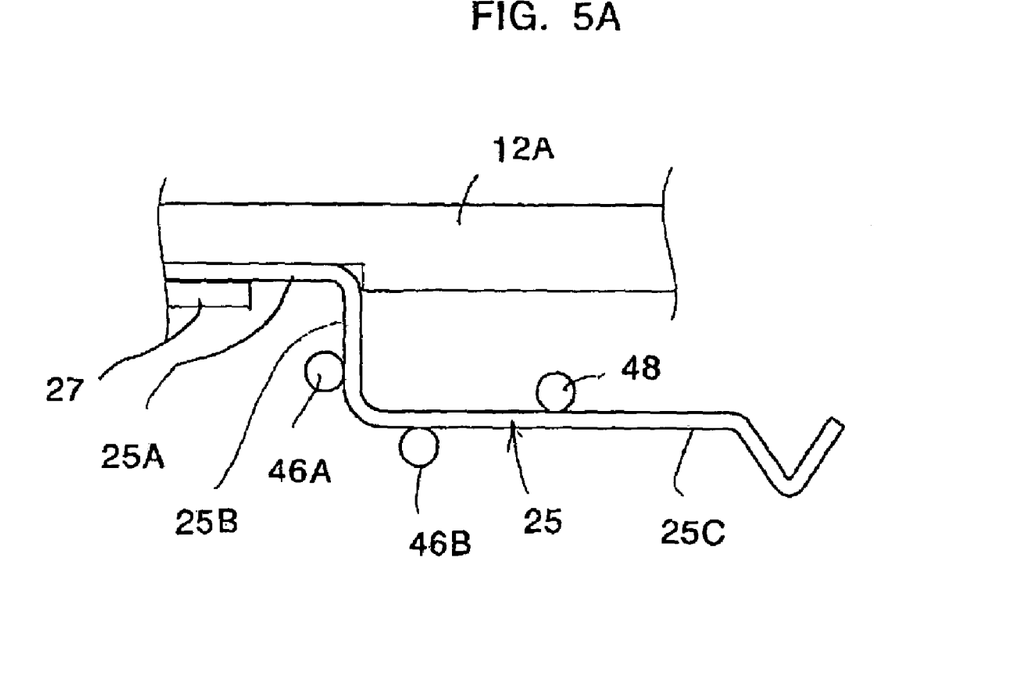
FIG. 5A is a schematic plan view showing main portions of the lower case with an anchor spring whose end has an alternative form.

The anchor spring 25 is shaped as a plate spring. The anchor spring 25 may be made from a synthetic resin or formed by bending a metal plate. The anchor spring 25 is often made to have a thickness of 0.25 mm. The metal SUS 304 is often employed. As shown in FIG. 3, the anchor spring 25 has the proximal portion 25A which is held at the spring holding portions 27, a central portion 25B which is bent and extends at about 90° from the proximal portion 25A, and the bifurcated operation portion 25C which is bent at about 90° from the central portion 25B and extends parallel to the proximal portion 25A. The distal ends (free ends) of the operation portion 25C are shaped such that their surfaces which abut the upper and lower ends of the leader pin 22 are substantially arc shaped as seen in plan view. Alternatively, the distal ends of the operation portion 25C are formed to appear V-shaped as seen in FIG. 5A.

Two solid cylindrical supporting projections 46A and 46B and a solid cylindrical fulcrum projection 48 project out to predetermined heights at each of the upper case 16 and the lower case 18. The solid cylindrical supporting projections 46A and 46B abut the curved portion (the substantial border portion) of the central portion 25B and the operation portion 25C at the case inner side so as to sandwich this curved portion (substantial border portion) from the central portion 25B side and the operation portion 25C side respectively. The solid cylindrical fulcrum projections 48 abut an appropriate position of the operation portion 25C from the case outer side (the front wall 12A side) Supporting projections 46A and 46B are dispensable except for embodiments using the anchor spring 25 with the L-shaped curved portion in a plan view as in the drawings. When the supporting projections 46A and 46B are used for the anchor spring 25, the supporting projection 46A is to abut the central portion 25B and the supporting projection 46B is to abut the operation portion 25C for limiting deflection respectively. Either of the supporting projection 46A or 46B may be sufficient. In some cases, both of the supporting projections 46A and 46B may be employed. The supporting projections 46A and 46B for limiting deflection will ensure controlling pushing force activated by supporting projections 48, 13A and 23A onto the operation portion 25C. This will be described later.

The supporting projection 46A is provided along a straight portion of the central portion 25B, and may be provided closer to the interior of the case (at a lower portion of the central portion 25B in FIG. 3) for limiting deflection. The supporting projection 46B is provided along a straight portion of the operation portion 25C, may be provided closer to the curved portion (at a left most portion of the operation portion 25C in FIG. 3). In every case, diameters of the supporting projections 46A and 46B are often made to be about 0.7 mm.

A diameter of the fulcrum projection 48 is in a range of 0.5 mm to 1.5 mm, and may be about 1.0 mm. Due to the fulcrum projection 48, when the leader pin 22 enters in or exits out from the pin holding portions 24, a portion of the operation portion 25C of the anchor spring 25 rotates (elastically deforms) toward the front wall 12A side with the fulcrum projections 48 serving as fulcra, such that movement of the leader pin 22 is permitted. Namely, the entire operation portion 25C of the anchor spring 25 does not elastically deform as in the conventional art. Rather, movement of the leader pin 22 is permitted due to the portions from the fulcrum projections 48 to the distal ends of the operation portion 25C (the free ends abutting the upper and lower ends of the leader pin 22) elastically deforming. Accordingly, spring fatigue of the anchor spring 25 due to frequent use can be kept to a minimum, and the leader pin 22 can always be pushed at the appropriate pushing force (elastic force).

Figure 4:
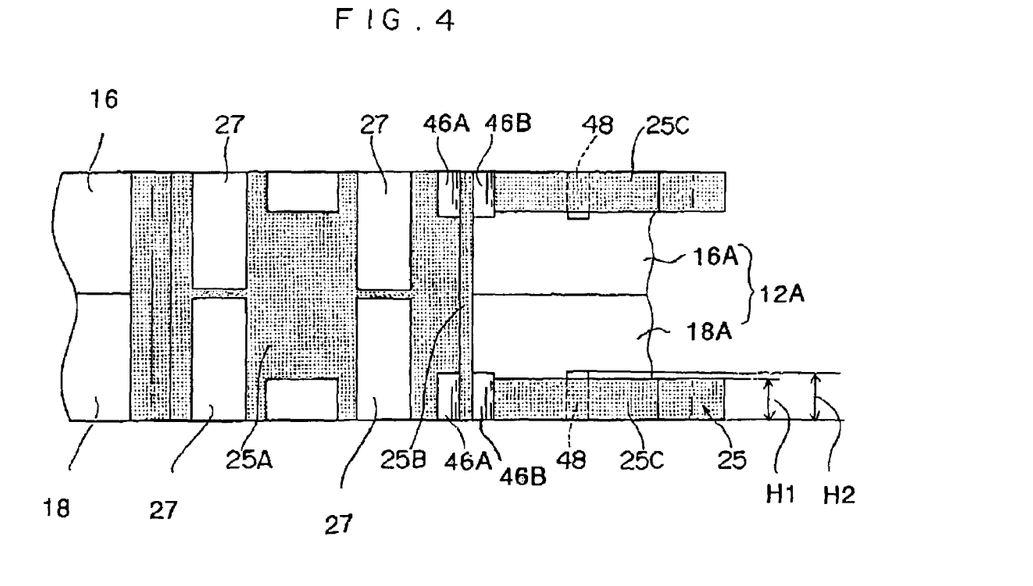
FIG. 4 is a view taken along line X—X of FIG. 3.

The fulcrum projection 48 is 0.5 times to 1.5 time as high as the branched operation portion 25C. As shown in FIG. 4, the fulcrum projections 48 are often made to be taller than the operation portion 25C. For example, if the height H1 of the operation portion 25C were 1.0 mm, the height H2 of the fulcrum projection 48 would be 1.2 mm. If the fulcrum projection 48 is excessively short or shorter than 0.5 times as tall as the operation portion 25C, the operation portion 25C will be subject to torsion with an upper peripheral portion (abutting the operation portion 25C) of the fulcrum projection 48 as a fulcrum when the operation portion 25C elastically deforms. This is a reason for giving conditions of the height of fulcrum projection 48. An unillustrated tapered plain may be provided on the top of the fulcrum projection 48 for guiding the anchor spring 25 or the operation portion 25C to the interior of the case 12 when assembling.

When fitting the anchor spring 25 into the case 12, the operation portion 25C would be damaged if a durable base portion 25A were not first used for positioning. Thus, a spring holder 27 is often made to be taller than the fulcrum projection 48. The supporting projections 46A and 46B are generally made as tall as the fulcrum projection 48, however, the supporting projection 46A closest to the central portion 25B may be taller than the fulcrum projection 48.

Figure 5B:
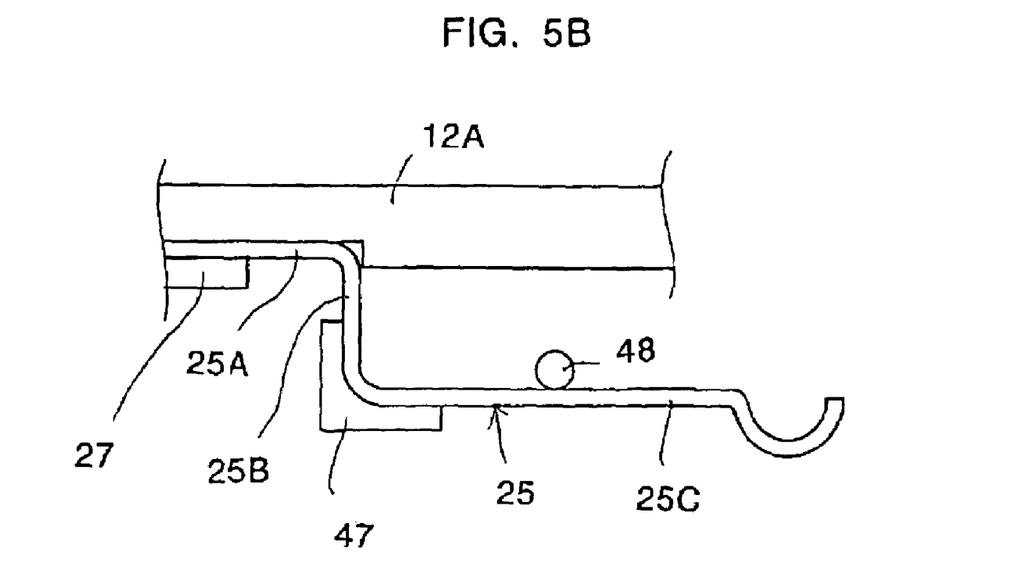
FIG. 5B is a schematic plan view showing main portions of the lower case whose anchor spring is supported by a rib.

As shown in FIG. 5B, an L-shaped supporting rib 47 in a plan view may be provided along the form of the curved portion between the portions 25B and 25C instead of the supporting portions 46A and 46B. The height of the supporting rib 47 is often made to be equal to the height of the supporting portion 46B. The supporting rib 47 is formed L-shaped to ensure sufficient rigidity. Due to this ensured rigidity, the thickness of the supporting rib 47 can be smaller than the diameters of the supporting projections 46A and 46B. In practice, the thickness is often made to be equal to the diameters of the supporting projections 46A and 46B.

Figure 6A:
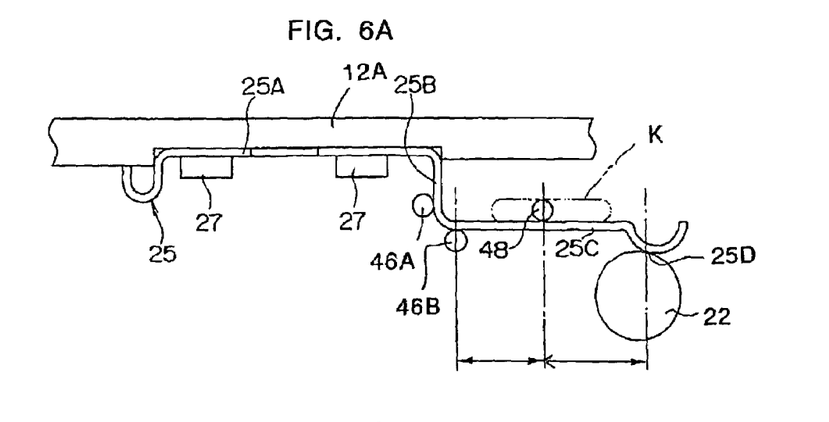
FIG. 6A is a schematic plan view showing main portions of the lower case in which a fulcrum projection is provided at a reference position.
Figure 6B:
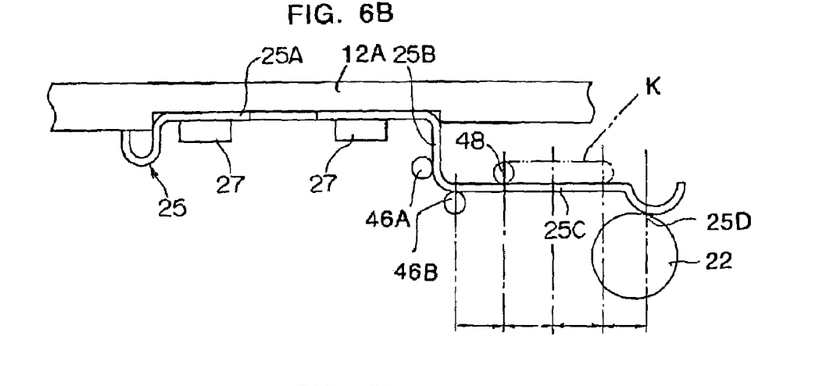
FIG. 6B is a schematic plan view showing main portions of the lower case in which a fulcrum projection is provided left of the reference position.

By appropriately changing the position at which the fulcrum projections 48 abut the operation portion 25C, the pushing force (elastic force) of the distal end (free end) portions which push the upper and lower ends of the leader pin 22 can be appropriately adjusted. For example, as shown in FIG. 6A, the position of the fulcrum projections 48 between an abutting point 25D (the free end of the operation portion 25C) of the leader pin 22 and the center of the supporting projection 46B is used as a reference. At a position between the reference and the supporting projection 48 as shown in FIG. 6B, the pushing force becomes weaker than at the reference or elastic deformation will be caused thereby. At a position between the reference and the abutting point 25D as shown in FIG. 6C, the pushing force becomes greater than at the reference or elastic deformation will not be easily caused.

Figure 6C:
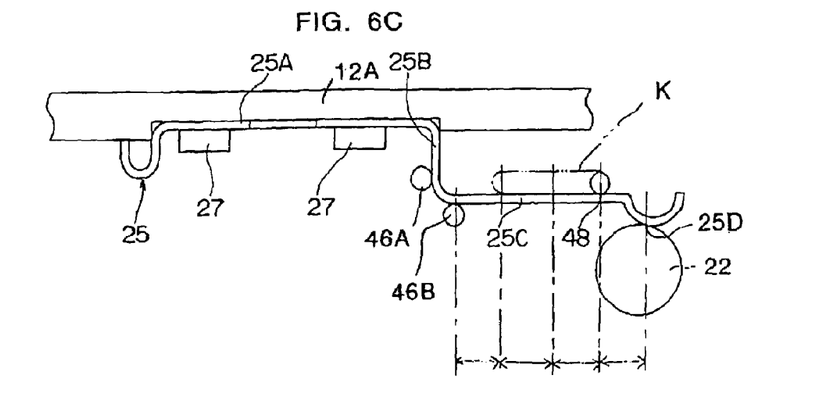
FIG. 6C is a schematic plan view showing main portions of the lower case in which a fulcrum projection is provided right of the reference position.

At least the regions shown by the imaginary lines K in FIGS. 6A through 6C are insert dies which can be replaceably attached to and removed from a mold for injection molding, and insert dies in which the positions of the fulcrum projection 48 are different are fabricated in advance. In this way, during the molding stage, it is easy to manufacture the upper case 16 and the lower case 18 at which the positions of the fulcrum projections 48 have been adjusted. A range of adjusting the position of the fulcrum projection 48 or the anchor spring 25 is normally within ¼ of the distance between the supporting projection 46B and the abutting point 25D right and left from the reference. In other words, the range of adjusting may be defined by ½ of the distance between the reference and the supporting projection 46B in the left and ½ of the distance between the reference and the abutting point 25D in the right (see FIGS. 6B and 6C). The distance between the supporting projection 46B and the abutting point 25D is often in a range of 5.0 mm to 15.0 mm.

Figure 7A:
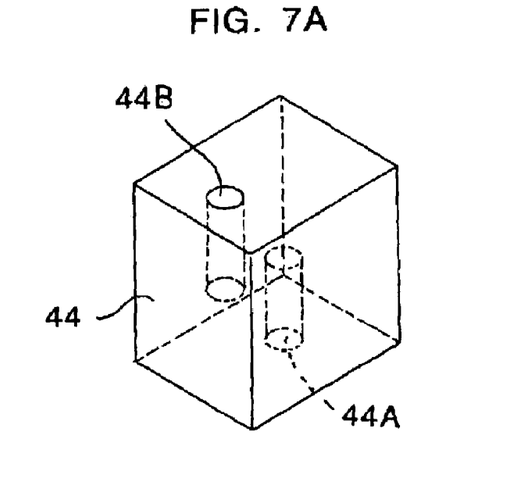
Figure 7B:
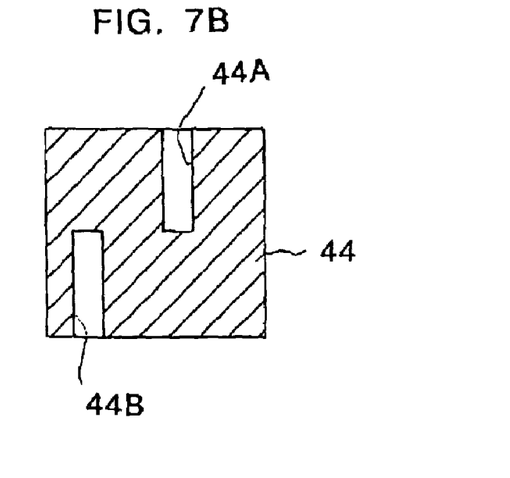
FIG. 7B is a schematic cross-sectional view showing an insert die.
Figure 7C:
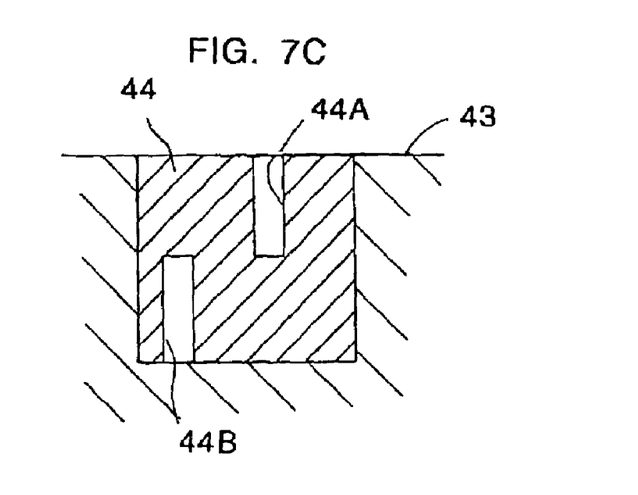
FIG. 7C is a schematic cross-sectional view showing an insert die, which is attached into a mold for injection molding.

Portions 44A and 44B with holes may be provided on the insert die 44 (see two holes in FIGS. 7A through 7C). By orienting the insert die 44 appropriately with the hall portions, the insert die 44 may become attachable to a mold for injection molding. With this single insert die 44, a variety of cases 12 having the supporting projections 48 at different positions can be manufactured. In case of the insert die 44 in FIGS. 7A through 7C, two types of the case 12 can be manufactured by reversing the front and the back, and other two types can be manufactured by reversing the left and the right. More in details, the front having the portion 44A can be used for manufacturing the supporting projection 48 in FIG. 6A. The back having the portion 44B can be used for manufacturing the supporting projection 48 in FIG. 6B. By reversing the left and the right of the insert die 44, the supporting projection 48 in FIG. 6C can be manufactured.

In this way, by appropriately changing the positions of the fulcrum projections 48 which project at the case 12 (the upper case 16 and the lower case 18), the pushing force (elastic force) of the anchor spring 25 with respect to the leader pin 22 can be adjusted. Thus, the leader pin 22 can always be pushed at the desired pushing force. As compared with a structure in which the elastic force of the anchor spring 25 itself is adjusted and maintained, the elastic force can be maintained more stably.

The position of the fulcrum projections 48 can be changed (the elastic force of the anchor spring 25 can be adjusted) merely by replacing the insert die. Thus, there is the advantage that the structure is inexpensive. Moreover, by providing the supporting projections 46A and 46B and the fulcrum projections 48, there is no need to provide grooves or the like for supporting the anchor spring 25 at the upper case 16 and the lower case 18. Thus, there is the advantage that the rigidities of the upper case 16 and the lower case 18 are not adversely affected. In addition, if the configuration of the anchor spring 25 or the like is changed, the positions where the supporting projections 46A and 46B project and the region where the fulcrum projections 48 project can of course be appropriately changed in accordance therewith.

Figure 8A:
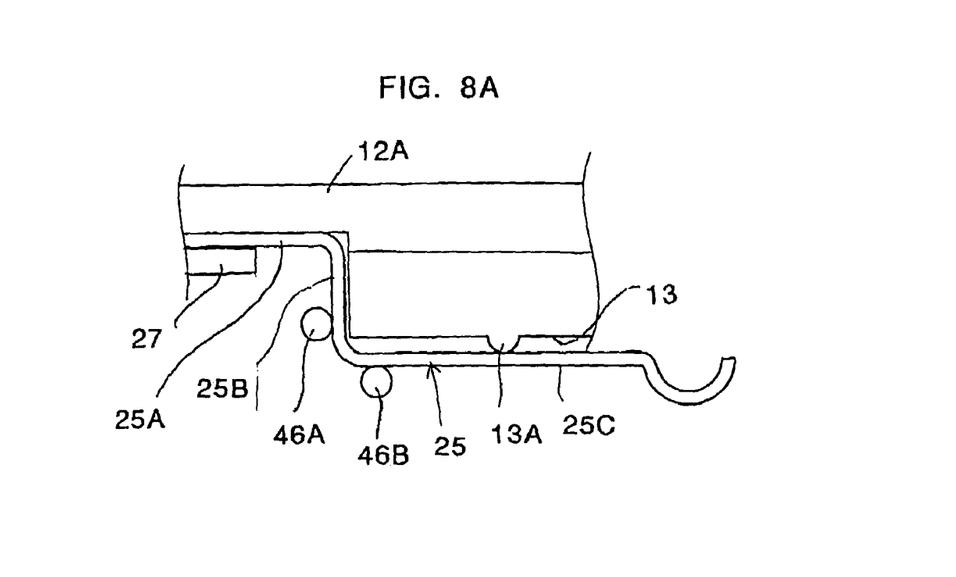
FIG. 8A is a schematic plan view showing supporting projections provided at restricting walls.
Figure 8B:
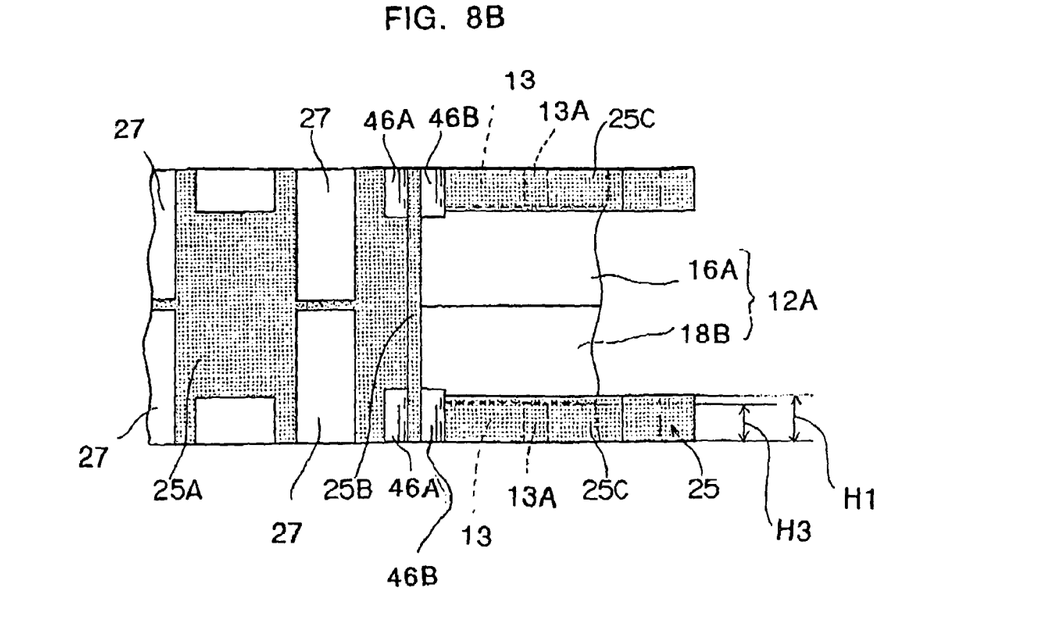
FIG. 8B is a schematic side view showing supporting projections provided at movement-restricting walls.

An alternative fulcrum projection 13A on a restricting wall 13 shown in FIGS. 8A and 8B may be formed instead of the supporting projection 48. In this case, the restricting wall 13 is formed along the anchor spring 25, as an extension uniformly from a front wall 12A. The fulcrum projection 13A is formed on the restricting wall 13 so as to abut a proper point on the operation portion 25C from the exterior of the case or the front wall 12A side. The height of the restricting wall 13 normally does not exceed the height of the operation portion 25C. For example, when the height H1 of the operation portion 25C is 1.0 mm, the height H3 of the restricting wall 13 will be in a range of 0.3 mm to 1.0 mm. In some cases, the height H3 may be 0.9 mm. These height conditions are effective for eliminating the acting torsion on the operation portion 25C instead of the fulcrum projection 48 when a wall is provided along the operation portion 25C.

Figure 9A:
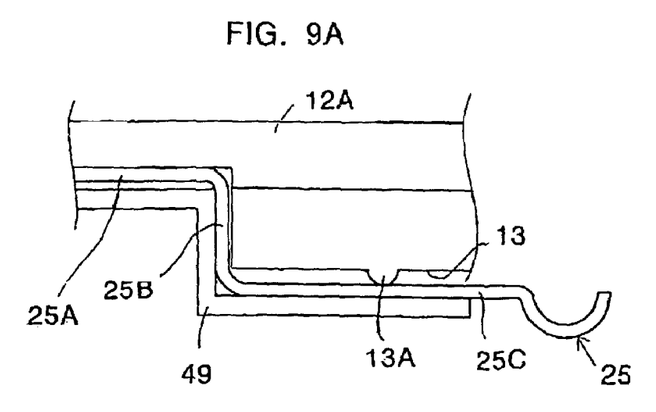
FIG. 9A is a schematic plan view showing supporting projections provided at restricting walls, and showing supporting walls.
Figure 9B:
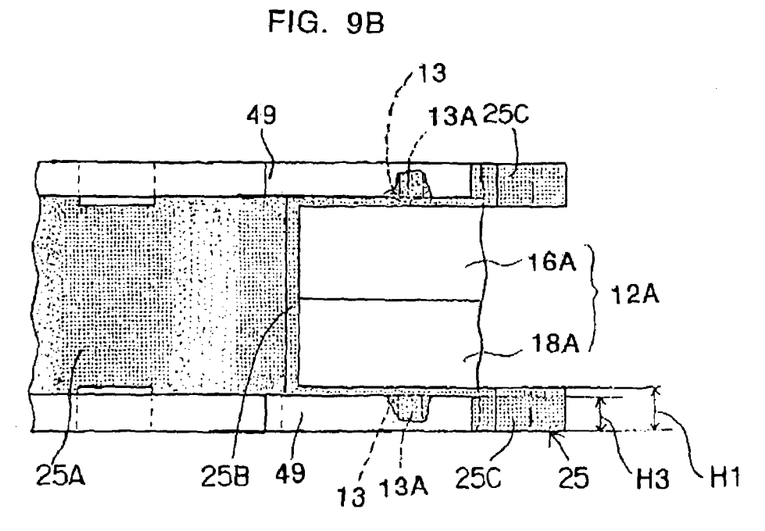
FIG. 9B is a partially broken schematic side view showing supporting projections provided at restricting walls, and showing supporting walls.

As a further alternative to the supporting projections 46A and 46B and the supporting rib 47, a supporting wall 49 may be provided parallel with the restricting wall 13 as shown in FIGS. 9A and 9B. The height of the supporting wall 49 may be equal to the height of the restricting wall 13. In this application of the supporting wall 49, the spring holding portion 27 can be omitted because the anchor spring 25 is held between the restricting wall 13 and the supporting wall 49. The restricting wall 13 maybe formed and uniformly extended from the front wall 12A as shown in FIGS. 8A through 9B. Alternatively, the restricting wall 13 may be provided independent from the front wall 12A like the supporting wall 49 to stand on the interior surfaces of the upper case 16 and the lower case 18.

Figure 10A:
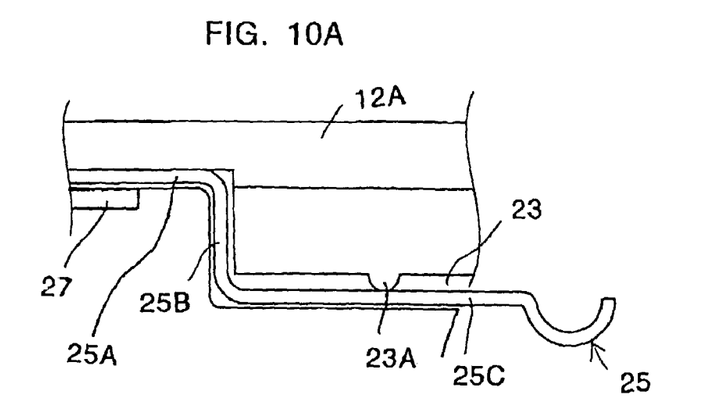
FIG. 10A is a schematic plan view showing supporting projections provided at restricting grooves.
Figure 10B:
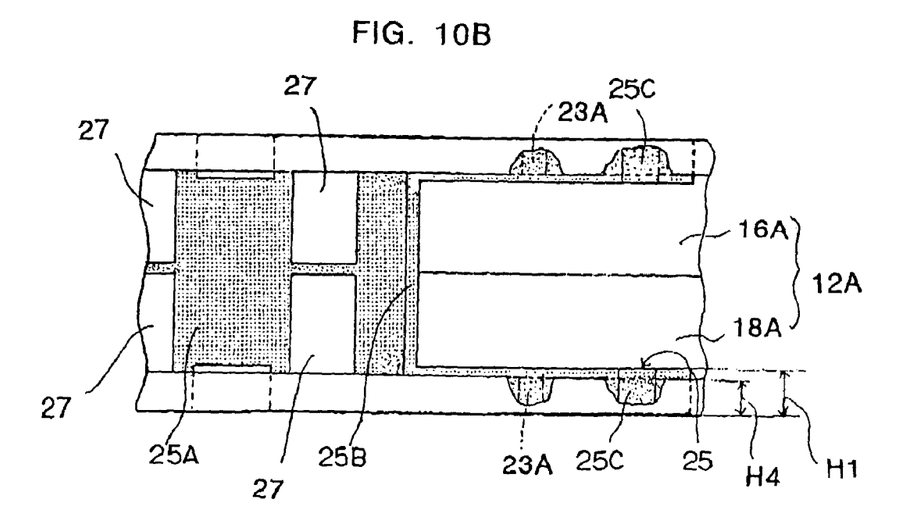
FIG. 10B is a partially broken schematic side view showing supporting projections provided at restricting grooves.

As shown in FIGS. 10A and 10B, a further alternative fulcrum projection 23A may be formed on a restricting groove 23. The restricting groove 23 is formed on both of the upper case 16 and the lower case 18 to have a clearance for inserting the anchor spring 25. The second fulcrum projection 23A is formed on an inner side closer to the exterior of the case (or the front wall 12A side) of the restricting groove 23. The height of the fulcrum projection 23A, that is the depth of the restricting groove 23 normally does not exceed the height of the operation portion 25C. When the height H1 of the operation portion 25C is 1.0 mm, the depth H4 of the restricting groove 23 will be in a range of 0.5 mm to 1.0 mm. In some cases, the depth H4 may be 0.9 mm. Similarly to the application of the fulcrum projection 13A, these height conditions are effective for eliminating the acting torsion on the operation portion 25C instead of the fulcrum projection 48 when a wall is provided along the operation portion 25C.

Next, the door 50 will be described. The opening 20 is opened and closed by the door 50 which serves as a closing member as shown in FIGS. 1 through 3. The plate width (height) of at least the portion of the door 50 for closing the opening 20 is substantially the same as the opening height of the opening 20. The plate length of this portion is formed to be sufficiently larger than the opening width of the opening 20. Further, the door 50 is formed in a substantial arc-shape in plan view which is curved in the direction of the plate thickness, so that the door 50 can move along a predetermined circumference.

The door 50 closes the opening 20 in a state in which the distal end portion of the door 50 has entered into the concave portions 30A of the inclined wall portions 30, when the door 50 slides (rotates) substantially rearwardly along the aforementioned predetermined circumference so as to open the opening 20 and the outer peripheral surface in the vicinity of the distal end of the door 50 reaches a vicinity of the screw bosses 36, the opening 20 is completely opened. Further, the door 50 closes the opening 20 by sliding (rotating) in the direction opposite to the direction at the time of opening the opening 20. Note that the lower rear portion of the door 50 is notched obliquely in order to avoid the memory board M which is disposed at the inclined surface of the rear inner wall 18B of the lower case 18.

The convex portions 51 project from the top surface and the bottom surface of the door 50. The convex portions 51 abut the guide surfaces of the guide wall portions 42 (the inner side surfaces which oppose each other) and the inner surface of the upper case 16 and the inner surface of the lower case 18 between the guide wall portions 42, and guide the door 50 in the directions of opening and closing the opening 20. The convex portions 51 are for reducing the sliding resistance (friction) between, on the one hand, the door 50, and, on the other hand, the guide surfaces of the guide wall portions 42 and the inner surface of the upper case 16 and the inner surface of the lower case 18 between the guide wall portions 42. The convex portions 51 are formed in substantially oval shapes as seen in plan view which are long along the longitudinal direction of the door 50. Four convex portions 51 project at each of the upper surface and the lower surface of the door 50 so as to have top/bottom symmetry (except for the convex portions 51 furthest toward the rear), and so as to project to substantially the same heights as the heights of the guide wall portions 42. Note that the convex portions 51 furthest toward the rear do not have top/bottom symmetry because the bottom rear portion of the door 50 is cut obliquely.

Projections 51A, which are substantially arc-shaped or the like as seen in plan view, project at the both side surfaces of the convex portions 51. When the convex portions 51 are inserted between the guide wall portions 42 and slide, the distal ends of the convex portions 51 contact the inner surface of the upper case 16 and the inner surface of the lower case 18, and the distal ends of the projections 51A contact the mutually opposing guide surfaces of the guide wall portions 42. Thus, the sliding resistance (friction) is reduced, and the door 50 can be slid smoothly with little resistance. Further, when the convex portions 51 are formed in substantially oval shapes as seen in plan view, the impact resistance thereof is excellent. Even if force is applied to the door 50 from a direction other than the opening/closing directions due to the impact of a drop or the like, there is no fear that the convex portions 51 will break.

The operation projection 52, which serves as an operation portion, projects along the radial direction of the door 50 at the outer peripheral surface, slightly further toward the front than the longitudinal direction central portion of the door 50. The operation projection 52 is exposed to the exterior of the case 12 from the slit 40, and is positioned so as to be set apart slightly from the rear ends of the screw bosses 36 when the opening 20 is in a closed state, and can be operated from the portion of the slit 40 which opens toward the front. Further, in the state in which the opening 20 is open, the operation projection 52 is positioned so as to be set apart slightly from the rear edge of the slit 40.

At this time, the convex portions 51 at the rearward most end side abut the rear end portions of the guide wall portions 42. The dimensions of the respective portions are determined such that, in this state, the longitudinal direction of the operation projection 52 is substantially perpendicular to the right wall 12B of the case 12 (i.e., is substantially perpendicular to the direction of arrow A). Further, the interior and exterior of the ease 12 communicate through the slit 40 for exposing the operation projection 52. However, the adhesion of dust and the like to the magnetic tape T wound on the reel 14 is prevented by the slit 40 always being substantially closed by the screw bosses 36 and by the door 50 which extends across substantially the entire height of the case 12, and is prevented by the movement restricting walls 28 which serve as inner walls.

A spring holding portion 54 projects at the inner peripheral portion of the door 50 in a vicinity of the rear end thereof. One end portion of a coil spring 56 is anchored on and held by this spring holding portion 54. The other end portion of the coil spring 56 is anchored on a spring anchor portion 55 provided within the case 12. In this way, the door 50 is always urged in the direction of closing the opening 20 by the urging force of the coil spring 56, and usually closes the opening 20. Further, stoppers 58 project from the inner surface of the door 50 at the front end portion thereof. When the opening 20 is closed, the stoppers 58 abut the upper end portion side surface and the lower end portion side surface of the leader pin 22. The stoppers 58 even further prevent the leader pin 22 from falling out from the pin holding portions 24 due to impact caused by dropping or the like.

Next, operation at the above-described recording tape cartridge 10 will be briefly described. When the recording tape cartridge 10 having the above-described structure is not being used (i.e., is being stored, is being transported, or the like), the opening 20 is closed by the door 50. Specifically, due to the urging force of the coil spring 56, the distal end portion (front end portion) of the door 50 enters into the concave portions 30A of the inclined wall portions 30, and the outer peripheral surface of the intermediate portion of the door 50 substantially contacts the inner surfaces of the inclined wall portions 34, and the door 50 closes the opening 20.

When the magnetic tape T is to be used, the recording tape cartridge 10 is loaded into a drive device along the direction of arrow A. Accompanying this loading, an opening/closing member (not illustrated), provided at the drive device, enters into the slit 40 which opens toward the front, and engages with the operation projection 52 of the door 50. In this state, when the recording tape cartridge 10 (the case 12) is pushed in further, due to the pushing-in force, the opening/closing member moves the operation projection 52 rearward against the urging force of the coil spring 56. Or, it can be said that the operation projection 52 is moved rearward relative to the case 12 which is loaded in the direction of arrow A.

Then, while the convex portions 51 are guided by the guide wall portions 42, the door 50, from which the operation projection 52 projects out, rotates clockwise as seen in plan view along the direction of curving thereof. Namely, due to the guide wall portions 42, the door 50 does not jut out from the locus of movement along the curved configuration thereof, but rather moves substantially rearward so as to circle around the outer side of the pin holding portions 24 and the reel 14, and opens the opening 20. Then, when the case 12 (the recording tape cartridge 10) is loaded to a predetermined depth in the drive device, the opening 20 is completely opened.

In this state, when the recording tape cartridge 10 is positioned within the drive device, further rotation (substantially rearward movement) of the door 50 is restricted. The pull-out means of the drive device enters into the case 12 from the opening 20 which has been opened. The pull-out means pulls-out the leader pin 22 which is positioned and held at the pin holding portions 24. At this time, the operation portion 25C of the anchor spring 25 elastically deforms while the rotation thereof is restricted by the fulcrum projections 48, and movement of the leader pin 22 is permitted.

In this way, the leader pin 22, which has been removed from the pin holding portions 24, is accommodated at the take-up reel (not shown) of the drive device. Due to the take-up reel and the reel 14 being driven to rotate synchronously the magnetic tape T is successively pulled-out from the case 12 while being taken-up onto the take-up reel. Information is recorded or played back by a recording/playback head or the like disposed along the predetermined tape path.

When the magnetic tape T is rewound onto the reel 14 and the recording tape cartridge 10 is to be ejected from the drive device, the leader pin 22 is returned to the pin holding portions 24. At this time, the operation portion 25C of the anchor spring 25 elastically deforms as the leader pin 22 enters into the pin holding portions 24. However, rotation of the operation portion 25C is suitably restricted by the fulcrum projections 48. In this way, the leader pin 22 is pushed at a predetermined pushing force by the operation portion 25C of the anchor spring 25 and is stably held at the pin holding portions 24.

Thereafter, the positioned state of the recording tape cartridge 10 is released and the recording tape cartridge 10 is moved in the direction opposite to the direction of arrow A by the urging force of the coil spring 56 or by an unillustrated ejecting mechanism. Then, while the convex portions 51 of the door 50 are guided by the guide wall portions 42, the door 50 is rotated in the direction of closing the opening 20 by the urging force of the coil spring 56. Due to the distal end portion of the door 50 entering into the concave portions 30A of the inclined wall portions 30, the opening 20 is completely closed.

Note that the illustrated opening 20 is formed by cutting the front right corner portion of the case 12 at an angle, and the plane of opening of the opening 20 is directed in the direction of arrow A and the direction of arrow B. Thus, the pull-out means of the drive device can access the leader pin 22 from the direction of arrow A, or from the direction of arrow B, or from between the direction of arrow A and the direction of arrow B, and can fix the leader pin 22. Accordingly, the degrees of freedom in designing the drive device can be increased. It goes without saying that the fulcrum projections 48, 13A and 23A of the present invention, which adjust the pushing force (elastic force) of the anchor spring 25 with respect to the leader pin 22, can similarly be applied to the conventional recording tape cartridge shown in FIG. 11.

As described above, in accordance with the present invention, the elastic force of the anchor spring which pushes the leader pin is adjusted by the fulcrum projections which are provided at the case between the proximal portion and the free end of the anchor spring. Accordingly, as compared with a case in which the elastic force of the anchor spring is adjusted at the anchor spring itself, the leader pin can always be held in a more stable state.

What is claimed is:

1. A recording tape cartridge comprising:
   a case accommodating a single reel, on which a recording tape is wound, such that the reel is rotatable;
   a portion having an opening which is for pulling-out of a leader pin attached to an end portion of the recording tape, the portion being formed at the case;
   a pin holding portion holding the leader pin in a vicinity of the opening; and
   an anchor spring having a proximal portion and a free end, and the proximal portion is fixed to the case, and at the free end, the anchor spring pushes the leader pin and holds the leader pin at the pin holding portion,
   wherein a projection, which is a fulcrum of the anchor spring and which is positioned between the proximal portion and the free end of the anchor spring, is provided at the case, and
   wherein the anchor spring comprises a plate spring and has a central portion which is bent and extends at about 90° from the proximal portion, and a bifurcated operation portion which is bent at about 90° from the central portion and extends parallel to but in an opposite direction from the proximal portion, and the free end comprises distal ends of branches of the operation portion, and the distal ends of the branches are shaped such that surfaces thereof which abut both ends of the leader pin are arc-shaped in plan view.

2. The recording tape cartridge of claim 1, further comprising:
   a door which can close the opening; and
   a guide wall portion provided at an inner side of the case, and supporting at least one portion of the door so as to sandwich the at least one portion of the door,
   wherein the pin holding portion is provided so as he integral with and continuous with the guide wall portion.

3. The recording tape cartridge of claim 2, wherein the pin holding portion is a same height as the guide wall portion.

4. The recording tape cartridge of claim 2, wherein the pin holding portion is formed to be higher than the guide wall portion.

5. The recording tape cartridge of claim 1, wherein the anchor spring is formed by shaping a metal plate.

6. The recording tape cartridge of claim 1, wherein the recording tape is a magnetic tape.

7. The recording tape cartridge of claim 1, wherein the case has a region at which the projection which is a fulcrum can be set, and a position at which the projection which is a fulcrum is provided at the case can be changed within the region.

8. The recording tape cartridge of claim 7, wherein the region is an insert die which can be replaceably attached to and removed from an injection molding mold, and insert dies having different positions of the projection which is a fulcrum are fabricated in advance, and a position at which the projection which is a fulcrum is provided at the case can be changed by selecting the insert die.

9. The recording tape cartridge of claim 1, wherein the pin holding portion demarcates a semicircular shape in plan view, and a portion of the pin holding portion which faces a portion of the recording tape which is pulled-out is open, and an end portion of the leader pin at a position perpendicular to an inner surface of the case at which the pin holding portion is provided, van enter into and exit from an inner side of the semicircular shape from the portion which is open.

10. The recording tape cartridge of claim 9, wherein the anchor spring has a operation portion which is provided so as to be continuous with the free end, and when the leader pin enters into and exits from the pin holding portion, the operation portion elastically deforms such that movement of the leader pin is permitted.

11. The recording tape cartridge of claim 1, wherein the projection which is a fulcrum abuts a position of the anchor spring where the operation portion exists.

12. The recording tape cartridge of claim 11, wherein a height of the projection which is a fulcrum is less than or equal to a height of the operation portion.

13. The recording tape cartridge of claim 11, wherein the projection which is a fulcrum is of a height such that the projection which is a fulcrum can engage with the operation portion.

14. The recording tape cartridge of claim 1, further comprising two supporting projections provided at the case, wherein the supporting projections can abut a curved portion of the central portion and the operation portion of the anchor spring so as to sandwich the curved portion.

15. The recording tape cartridge of claim 14, wherein the supporting projection which is near to the central portion is formed to be a height which is greater than or equal to a height of the projection which is a fulcrum.

16. The recording tape cartridge of claim 14, wherein the supporting projection which is near to the operation portion is the same height as a height of the projection which is a fulcrum.

17. A recording tape cartridge comprising:
   a case accommodating a single reel, on which a recording tape is wound, such that the reel is rotatable;
   a portion having an opening which is for pulling-out of a leader pin attached to an end portion of the recording tape, the portion being formed at the case;
   a pin holding portion holding the leader pin in a vicinity of the opening; and
   an anchor spring having a proximal portion and a free end, and the proximal portion is fixed to the case, and at the free end, the anchor spring pushes the leader pin and holds to leader pin at the pin holding portion,
   wherein a projection, which is a fulcrum of the anchor spring and which is positioned between the proximal portion and the free end of the anchor spring, is provided at the case,
   wherein the anchor spring has a central portion which is bent and extends at about 90° from the proximal portion, and a bifurcated operation portion which is bent at about 90° from the central portion and extends parallel to but in an opposite direction from the proximal portion, and the free end comprises distal ends of branches of the operation portion, and the distal ends of the branches are shaped such that surfaces thereof which abut both ends of the leader pin are arc-shaped in plan view;
   further comprising two supporting projections provided at the case, wherein the supporting projections are operative to abut a curved portion of the central portion and the operation portion of the anchor spring so as to sandwich the curved portion.

18. The recording tape cartridge of claim 17, wherein the supporting projection which is near to the central portion is formed to be a height which is greater than or equal to a height of the projection which is a fulcrum.

19. The recording tape cartridge of claim 17, wherein the supporting projection which is near to the operation portion is the same height as a height of the projection which is a fulcrum.

* * * * *